United States Patent [19]

Bellows

[11] Patent Number: 4,895,696

[45] Date of Patent: Jan. 23, 1990

[54] STEAM TURBINE PRESERVATIVE AND METHOD OF PRESERVING STEAM TURBINE COMPONENTS

[75] Inventor: James C. Bellows, Maitland, Fla.

[73] Assignee: Westinghouse Electric Corp., Pittsburgh, Pa.

[21] Appl. No.: 124,302

[22] Filed: Nov. 23, 1987

[51] Int. Cl.$^4$ .......................... G21C 1/01; C23F 11/00
[52] U.S. Cl. .................................... 376/305; 252/390; 422/16; 165/134.1
[58] Field of Search .......................... 376/305; 422/16; 252/390; 165/134.1

[56] References Cited

U.S. PATENT DOCUMENTS

| | | | |
|---|---|---|---|
| 3,965,027 | 6/1976 | Boffardi et al. | 252/390 X |
| 4,018,702 | 4/1977 | Boffardi et al. | 252/390 X |
| 4,071,639 | 1/1978 | Palmer et al. | 376/306 |
| 4,595,723 | 6/1986 | Henson et al. | 252/391 X |
| 4,596,849 | 6/1986 | Henson et al. | 252/391 X |

OTHER PUBLICATIONS

J. March, *Advanced Organic Chemistry* (3d ed., 1985), pp. 338–341, 359–362, 364–369, 377–379, 387, 395–396, 409–410, 421–424, 444, 472–473, 496, 501–504, 535, 553–554, 569–570, 590–592, 599–601, 605–607, 652–653, 689–691, 713–720, 723, 740–742, 784–786, 788–789, 792–793, 796, 798–802, 814–815, 825, 827–828, 870, 906–910, 931–932, 983–987, 989–990, 992–994, 1033–1036, 1043–1045, 1061–1062, 1066–1070, 1083–1084, 1099–1100, 1103–1110, 1153–1154.

Primary Examiner—John S. Maples

[57] ABSTRACT

A steam turbine preservative and method of preserving steam turbine components involves the application of an amine polymer as a non-aqueous layer to the surfaces of such components. An organic solvent is mixed with the amine polymer to adjust its application viscosity.

20 Claims, No Drawings

STEAM TURBINE PRESERVATIVE AND METHOD OF PRESERVING STEAM TURBINE COMPONENTS

BACKGROUND OF THE INVENTION

This invention relates generally to steam turbine preservatives, and more particularly to a novel steam turbine preservative and method of preserving steam turbine components utilizing an amine polymer.

Steam turbine components have traditionally been preserved with one of two principal preservatives: either petroleum derivatives such as oils and greases or hard coatings such as lacquers. On the one hand, lacquers tend to crack over time thereby losing their efficiency as a preservative. Petroleum derivatives, on the other hand, tend to "heal" cracks and scratches in the film surfaces of the preservative, thereby maintaining their efficiency as a preservative in spite of such temporary cracks and scratches. However, preservatives comprised of petroleum derivatives must be thoroughly removed from the steam turbine component to which they are applied, prior to the installation of such components, since substantial concentrations of oils and greases containing impurities such as sulfur and heavy metals must be necessarily avoided in feedwater supplies for the steam generators and turbines. This is especially the case in nuclear power plants where there is a concern for steam generator corrosion due to the presence of such impurities. Moreover, it is undesirable to assemble the turbine without preservatives since it may sit for extended periods of time before being operated. In the humid atmosphere to which such turbines may be exposed, corrosion will readily occur.

While preservatives for steam turbine components comprised of petroleum derivatives do offer the advantage of their quick removal from the component to which they are applied, their lacquer coating counterparts are difficult to remove and do not "heal" cracks and scratches formed in their surfaces. Moreover, lacquer coating preservatives if left on the component have a tendency of being caught on conventional condensate polisher resins as particulate matter when such polishers are employed in the condensate subsystem. It would, therefore, be desirable to provide a steam turbine preservative and method of preserving steam turbine components which would not suffer from the above described disadvantages experienced in the utilization of preservatives comprised of petroleum derivatives or lacquer coatings.

SUMMARY OF THE INVENTION

Accordingly, it is a general object of the present invention to provide a novel steam turbine preservative. More specifically, it is an object of the present invention to provide a steam turbine preservative and method of preserving steam turbine components in a nuclear power steam generation system, wherein the preservative dose not pose a threat to the efficiency of such steam generation system.

It is another object of the present invention to provide a steam turbine preservative and method of preserving steam turbine components which is "self-healing". As used herein, "self-healing" refers to the tendency of cohesive, viscous substances to rejoin after films of such substances have been scratched. Damage to "self-healing" steam turbine preservativesis, thus, a temporary effect.

It is yet another object of the present invention to provide a steam turbine preservative and method of preserving steam turbine components which is capable of ready decomposition in atmospheres of steam.

It is a further object of the present invention is to provide a steam turbine preservative and method of preserving steam turbine components which, upon its decomposition in such atmospheres of steam, yields innocuous compounds which do not pose a threat to the condensate and feedwater subsystems of the nuclear power steam generation system.

It is a yet a further object of the present invention to provide a steam turbine preservative and method of preserving steam turbine components which minimizes downtime of the nuclear power steam generation system during installation and replacement of steam turbine components having such preservatives applied to their surfaces.

Briefly, these and other objects of the present invention are accomplished by a steam turbine preservative comprised of an amine polymer. Since amines are normally part and parcel of the chemistry associated with conventional steam generation systems, and since long-chain amines are often used in vapor phase inhibitors, preservatives comprised of amine polymers represent a significant advantage over their petroleum derivative and lacquer coating counterparts. Not only are such amine polymers innocuous to the overall chemistry of steam generation systems, but they are also beneficial in their generation of a basic environment to neutralize any acid species upon their decomposition at the amine.

In accordance with one important aspect of the present invention, the preservative is produced by mixing an amine polymer having a molecular weight within a selected range, and a low number of carbon atoms in the monomer with a selected solvent to an appropriate application viscosity. The mixture is then applied to the component in a conventional manner, such as by spraying, and permitted to stand. After a short time, the solvent evaporates out of the mixture leaving the amine polymer to preserve the component.

In accordance with another important aspect of the present invention, the amine polymer preservative is permitted to remain upon the component even after its installation or replacement within the steam generation system. Obviously, this omission of a removal step before installation or replacement of the component satisfies the object of minimizing downtime of the steam generation system, but it also poses no threat to the chemistry of the steam generation system since the amine polymer preservative will advantageously decompose in the presence of an atmosphere of steam.

In accordance with yet another important aspect of the present invention, application thicknesses of the amine polymer preservative to a steam turbine component may be controlled by changing the application viscosity of such amine polymer preservative. As a result, thin layers of the amine polymer preservative will provide long-term protection for the component to which they are applied, while thicker layers of the amine polymer preservative will improve the desired characteristic of "self-healing".

Further details regarding amine polymers and processes through which they are produced are explained in the "Amines" section of Appendix B to J. March, *Advanced Organic Chemistry* (3d ed. 1985) which is incorporated herein by reference. Also found in March are details regarding chain formation and branching.

These and other objects, advantages and novel features according to the present invention will become more apparent from the following detailed description of the invention.

DETAILED DESCRIPTION OF THE INVENTION

The invention features a steam turbine preservative and method of preserving steam turbine components utilizing amine polymers. It should be noted at this juncture that, while the term "steam turbine components" will be utilized throughout the present application, the use of the term "steam turbine components" should in no way limit this invention. By the use of the term "steam turbine components", the applicant herein is referring to any otherwise uncoated metallic component used in a steam generation system such as steam generators in a nuclear power plant, moisture separator reheaters and other heat transfer components.

An amine polymer is selected and mixed, according to the present invention, with an organic solvent in ratios of approximately 1:1 to adjust the viscosity of such mixture to promote its ready application to the surfaces of a steam turbine component. While any amine polymer is suitable for the practice of the present invention, amine polymer which are synthesized in the absence of halides are preferred since halide compounds would promote corrosion of the component. In a similar manner, any suitable organic solvent may be utilized in accordance with the present invention as long as it is not a halogenated solvent, such as methylene chloride, and so long as it is not water-based. The presence of water in the mixture of the amine polymer and the solvent must be necessarily avoided since the presence of water in the resulting steam turbine preservative would also promote corrosion of the component.

The selected amine polymer should also have a low molecular weight, i.e., preferably in the range of from 500–20,000, since a low molecular weight preservative not only provides desirable application properties, but also since it is desirably not soluble with water for the same reasons stated herein above with reference to the desirability to avoid water-based solvents. A preservative having a molecular weight in the range of 500 is runny in nature, thereby facilitating its application in thin (e.g., approximately 1 mil) layers upon the steam turbine components, while a preservative having a molecular weight in the range of 20,000 is quite viscous, thereby facilitating its application in thick (e.g., approximately 3 mils) layers upon the steam turbine components and promoting the "self-healing" of cracks and scratches upon the surfaces of such preservative films. Furthermore, the selected amine polymer has from 2 to 5 carbon atoms in its monomer in order to optimize the decomposition properties of the preservative.

After mixing the amine polymer and the solvent to an appropriate application viscosity, the mixture is applied to the component to a desired thickness and allowed to dry. The solvent subsequently, evaporates from the mixture, leaving the amine polymer to preserve the component while it is exposed in an atmosphere of steam. Thereafter, when the component is to be installed or replaced, such installation or replacement is accomplished without prior removal of the preservative since the amine polymer decomposes to innocuous compounds over time in the presence of steam without posing a threat to the overall chemistry of the steam generation system.

While any amine polymer/solvent mixture may be suitably utilized as long as it meets the above described criteria, the following examples will describe preferred embodiments of the amine polymer preservative according to the present invention.

An essentially pure amount of 1,2 dichloroethane is condensed with ammonia in substantially stoichiometric ratios to produce a branched amine polymer with amine at each nitrogen tertiary. Hydrogen chloride which is formed as a by-product in the condensation process is carefully removed such as by an extraction process followed by a water wash. The resulting amine polymer is then mixed in a ratio of approximately 1:1 with synthesized naphtha to an appropriate application viscosity. By use of the term "synthesized naptha", applicant refers to an essentially pure naptha. Viscosity of the resulting amine polymer preservative, i.e., the residue which remains upon the surface of the steam turbine component after naphtha has evaporated, is controlled not only by the size of the amine polymer units, but also by the degree, of branching along the polymer chain. Any suitable means for reducing the degree of chain formation and branching may be used, but such degree of chain formation and branching is effectively controlled in accordance with this emdodiment of the present invention through the addition of chloroethane which can react only at one end of the chain, thereby stopping chain propagation.

On startup of the steam generation system, the above described residue decomposes into a mixture of ammonia, 1-hydroxy-2-aminoethane, ethylene diamine, and ethylene glycol, none of which are hazardous to the steam generation system. Furthermore, if the amine polymer preservative is caught on conventional condensate polisher resins, a simple caustic wash (e.g., with sodium hydroxide) tends to enhance the decomposition of the amine polymer preservative so caught. Since the amine polymer preservative as described above is also made entirely of synthesized compounds, impurities such as sulfur and heavy metals which 5 are detrimental to the efficient operation of the steam generation system are conveniently avoided.

The method of amine synthesis as described above is not critical to the practice of the present invention. Where possible, however, it is preferable to synthesize the amine polymer without utilizing a halide. Accordingly, the following example illustrates a preferred method of amine synthesis according to the present invention which avoids the use of such halides.

A reductive amination of glyoxal with ethylene diamine is conducted in a range of molar ratios of from 2.5:1 to 3.5:1. Preferably, the glyoxal and ethylene diamine are mixed in a molar ratio of approximately 2.9:1 in order to maintain a high level of branching. In order to control the degree of chain formation and branching, an effective amount of a monofunctional aldehyde (e.g., acetaldehyde) may be added to the reductive amination process. The resulting amine polymer is mixed in ratios of approximately 1:1 with synthesized naphtha as before to produce a mixture having an appropriate application viscosity. Thereafter, the mixture is applied to the steam turbine component such as by spraying, and the naphtha evaporates over time leaving the amine polymer residue upon the surface of the component.

Obviously, many modifications and variations of the present invention are possible in light of the above teachings. It is, therefore, to be understood that the present invention may be practiced otherwise than as specifically described herein without departing from the true spirit and scope thereof. The appended claims are accordingly intended to cover all such modifications.

I claim as my invention:

1. A method of preserving steam turbine components, comprising the steps of:
producing an amine polymer from substantially synthesized compounds; and
applying said amine polymer product in selected amounts as a non-aqueous layer upon the surfaces of the components.

2. The method according to claim 1, wherein said compounds are substantially halide-free.

3. The method according to claim 1, further comprising the step of mixing said amine polymer product with an organic solvent to a selected viscosity which is effective for application upon the surfaces of the components.

4. The method according to claim 3, wherein said organic solvent is substantially free of halogenated compounds.

5. A method of preserving steam turbine components, comprising the steps of:
mixing an amine polymer with an effective amount of a preselected organic solvent to adjust the viscosity of said mixture for application thereof to the components; and
applying said mixture to the components as an effective non-aqueous layer for decomposition thereof over a predetermined period of time.

6. The method according to claim 5, wherein said preselected solvent comprises naptha.

7. The method according to claim 5, wherein said effective layer applied to the components comprises a thickness of approximately 1 mil.

8. The method according to claim 5, wherein said predetermined period of time comprises approximately six months.

9. The method according to claim 5, further comprising the step of applying said mixture to the components in an effective layer for self-healing of cracks and scratches.

10. The method according to claim 9, wherein said effective layer comprises approximately 3 mils.

11. In a nuclear-powered system for generating a supply of steam to produce usable power therefrom, wherein the system includes at least one subsystem having a plurality of components which are exposed to the steam generated by the system, a method of preserving the components comprising the steps of:
providing a supply of 1, 2-dichloroethane;
condensing said 1, 2-dichloroethane with an effective amount of ammonia to yield a condensation product consisting essentially of an amine polymer and a condensation by-product of hydrogen chloride;
removing said hydrogen chloride by-product of said condensation process;
mixing an effective amount of naphtha with said amine polymer condensation product to adjust its viscosity for application thereof to the components; and
applying said mixture to the components;
whereby said naphtha evaporates upon application to the components leaving said amine polymer upon the components whereupon, in the presence of the steam, said amine polymer decomposes to a plurality of compounds innocuous to the operation of the nuclear-powered system.

12. The method according to claim 12, wherein said naphtha comprises a synthesized naphtha.

13. The method according to claim 12, wherein said effective amount of naptha comprises an amount approximately equivalent to the amount of amine polymer condensation product.

14. The method according to claim 12, wherein said 1, 2-dichloroethane comprises an essentially pure 1, 2-dichloroethane.

15. The method according to claim 14, further comprising the step of adding an effective amount of chloroethane to said condensation product to reduce the degree of chain formation and branching to form said amine polymer upon reaction between said 1, 2-dichloroethane and said ammonia.

16. In a nuclear-powered system for generating a supply of steam to produce usable power therefrom, wherein the system includes at least one subsystem having a plurality of components which are exposed to the steam generated by the system, a method of preserving the components comprising the steps of:
producing an amine polymer through reductive amination of glyoxal with ethylene diamine, said glyoxal and said ethylene diamine being combined together in molar ratios within a predetermined range to facilitate chain formation and branching of the amine polymer;
mixing an effective amount of synthesized naptha with said amine polymer product to adjust its viscosity for application thereof to the components; and
applying said mixture to the components;
whereby said naptha evaporates upon application to the components leaving said amine polymer upon the components whereupon, in the presence of the steam, said amine polymer decomposes to a plurality of compounds innocuous to the operation of the nuclear-powered system.

17. The method according to claim 16, wherein said predetermined range of molar ratios comprises from 2.5:1 to 3.5:1.

18. The method according to claim 16, wherein said effective amount of synthesized naptha comprises an amount approximately equivalent to the amount of said amine polymer product.

19. The method according to claim 16, further comprising an effective amount of a monofunctional aldehyde to reduce the degree of chain formation and branching to form said amine polymer upon reductive amination of said glyoxal and said ethylene diamine.

20. The method according to claim 19, wherein said monofunctional aldehyde comprises acetaldehyde.

* * * * *